United States Patent [19]

Knappe et al.

[11] 4,187,452
[45] Feb. 5, 1980

[54] ELECTROMECHANICAL TORSIONAL OSCILLATOR WITH RESONANT FREQUENCY AND AMPLITUDE CONTROL

[75] Inventors: LaVerne F. Knappe; Roger H. Peterson; Gary J. Stroebel, all of Rochester, Minn.

[73] Assignee: International Business Machines Corporation, Armonk, N.Y.

[21] Appl. No.: 608,120

[22] Filed: Aug. 27, 1975

[51] Int. Cl.² ............................................. H02K 41/00
[52] U.S. Cl. ..................................... 318/128; 350/6.6; 310/36; 335/229
[58] Field of Search ............................ 310/25, 36–39, 310/190; 318/119–133; 350/6; 335/229, 230

[56] References Cited

U.S. PATENT DOCUMENTS

| | | | |
|---|---|---|---|
| 2,417,077 | 3/1947 | Hoover, Jr. | 310/25 X |
| 2,673,318 | 3/1954 | Beitz | 318/133 X |
| 3,177,385 | 4/1965 | Montagu | 310/36 |
| 3,432,697 | 3/1969 | Albinger, Jr. et al. | 310/36 |
| 3,506,897 | 4/1970 | Clifford | 310/25 X |
| 3,609,485 | 9/1971 | Dostal | 310/36 X |
| 3,624,574 | 11/1971 | Montagu | 350/6 X |
| 3,642,344 | 2/1972 | Corker | 350/6 |
| 3,666,974 | 5/1972 | Dostal | 310/36 X |
| 3,921,045 | 11/1975 | Reich et al. | 318/127 |

Primary Examiner—Donovan F. Duggan
Attorney, Agent, or Firm—Robert W. Lahtinen

[57] ABSTRACT

A limited rotation electromechanical torsional oscillator for driving a mirror in an optical deflection system. A drive armature is mounted on a torsion bar at the opposite end from the torsion bar support. The ends of the armature lie in an air gap between two pole pieces. The magnet flux in the gap is caused to vary by means of a drive winding which results in armature rotation. Resonant frequency is varied by adjustment of the length of the torsion bar and the flux density. Q is varied by means of resistance in series with the drive winding.

8 Claims, 13 Drawing Figures

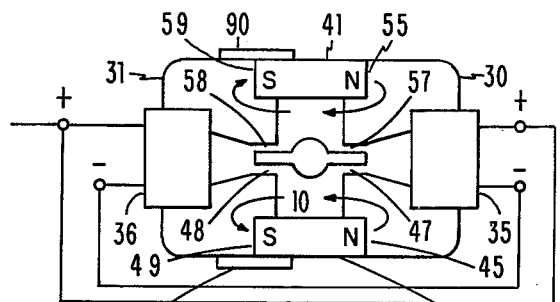
3a
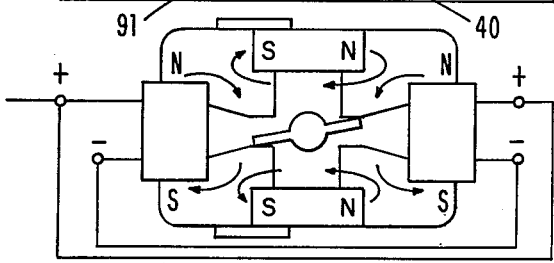
3b
FIG. 3
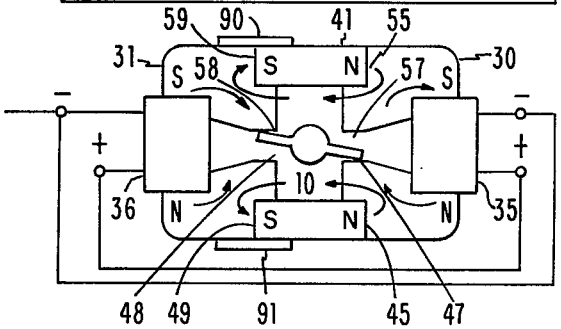
3c
FIG. 4a   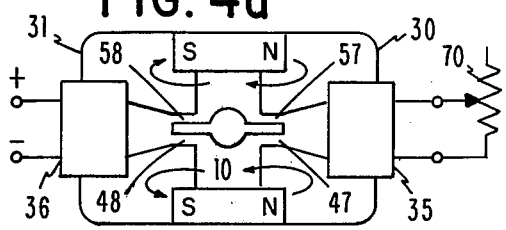   FIG. 5a   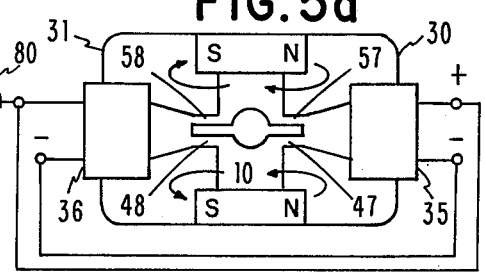
FIG. 4b   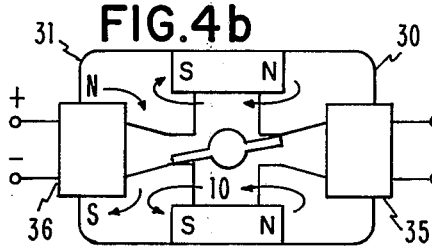   FIG. 5b   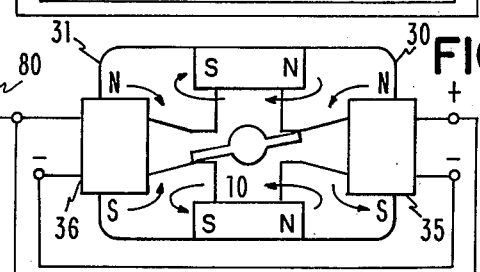
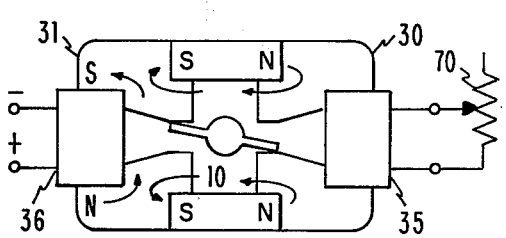   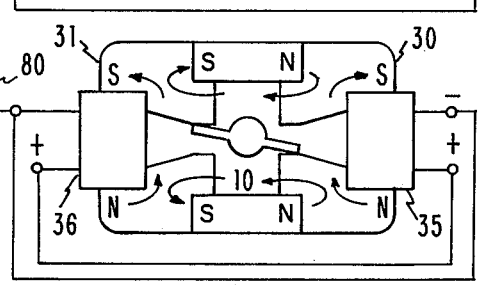
FIG. 4c   FIG. 5c

ELECTROMECHANICAL TORSIONAL OSCILLATOR WITH RESONANT FREQUENCY AND AMPLITUDE CONTROL

BACKGROUND OF THE INVENTION

This invention relates generally to electromagnetic actuators and more particularly to limited motion rotary devices used to drive mirrors in optical deflection systems.

A wide variety of such actuators exist for a corresponding number of specialized applications. Because these applications tend to require (1) low power or, (2) high Q at the resonant frequency or (3) large deflection angles or (4) large force or torque, there is no existing device which satisfies the needs of an actuator for an optical system useful in reading small labels affixed to packages (manufacturing ease). In this type of application, power requirements are not critical. Since the frequency of operation is fixed by the rest of the system and near the designed resonance of the device a high Q device is not desirable. Moderate deflection angles are entirely adequate and very little force is required.

On the other hand, the device must have a very long life and not be subject to failure. It should be easily manufactured, assembled, adjusted and tested. No materials should be used which require special processing or exceptional handling. The device should be physically rugged, able to withstand shocks, heat, humidity, and dust without adverse effects on its operation or life. It should be largely insensitive to the effect of heat and not dissipate much heat even during continuous operation. The production of large quantities of such devices should be easily accomplished without special skills, techniques or tools. Adjustments for resonant frequency and Q should be provided to accommodate larger tolerances in the manufacturing process. These adjustments should be easily made and hold their value for the life of the device.

SUMMARY OF THE INVENTION

The actuator of this invention is a limited rotation device having a torsion bar supported armature positioned across two pair of permanent magnet pole pieces. The magnetic flux in the air gap between the armature and pole pieces is caused to vary by a control winding induced flux. The control windings are arranged in the magnetic circuit so that the flux in the air gaps associated with one end of the armature is differentially affected by the induced flux. The flux on one side of the armature is increased and the flux on the other side is decreased, causing the armature to rotate in the direction of the air gap having the greater flux density.

The armature is positioned on a shaft which is supported at the end opposite from the armature. The mirror used to deflect the optical beam is located in close proximity to the armature. The device has a resonant frequency, and is intended for operation at or near resonance. Since energy dissipation or Q control is effective at the armature, the control of the mirror motion is facilitated by positioning it near the armature.

Q and resonant frequency are adjustable. A separate damping winding in series with a variable resistance or a variable resistor in series with the drive circuit and drive windings allow Q to be adjusted over a range of values. Resonant frequency is adjusted by means of a simple clamp, without the need to add or remove material from the shaft, armature or special tuning bars and by changing the air gap flux density by means of a shunt path across the permanent magnets.

DESCRIPTION OF THE DRAWINGS

FIGS. 3a, 3b and 3c show the armature movement in relation to the current flow in the control windings without the Q control feature.

FIGS. 4a, 4b and 4c show the armature movement in relation to current flow in one control winding, with Q control effected by a variable resistance in series with a second control winding.

FIGS. 5a, 5b and 5c show the armature movement in relation to current flow in both control windings with Q control effected by means of a variable resistance in series circuit with the control windings.

DETAILED DESCRIPTION OF THE INVENTION

Figure 1:
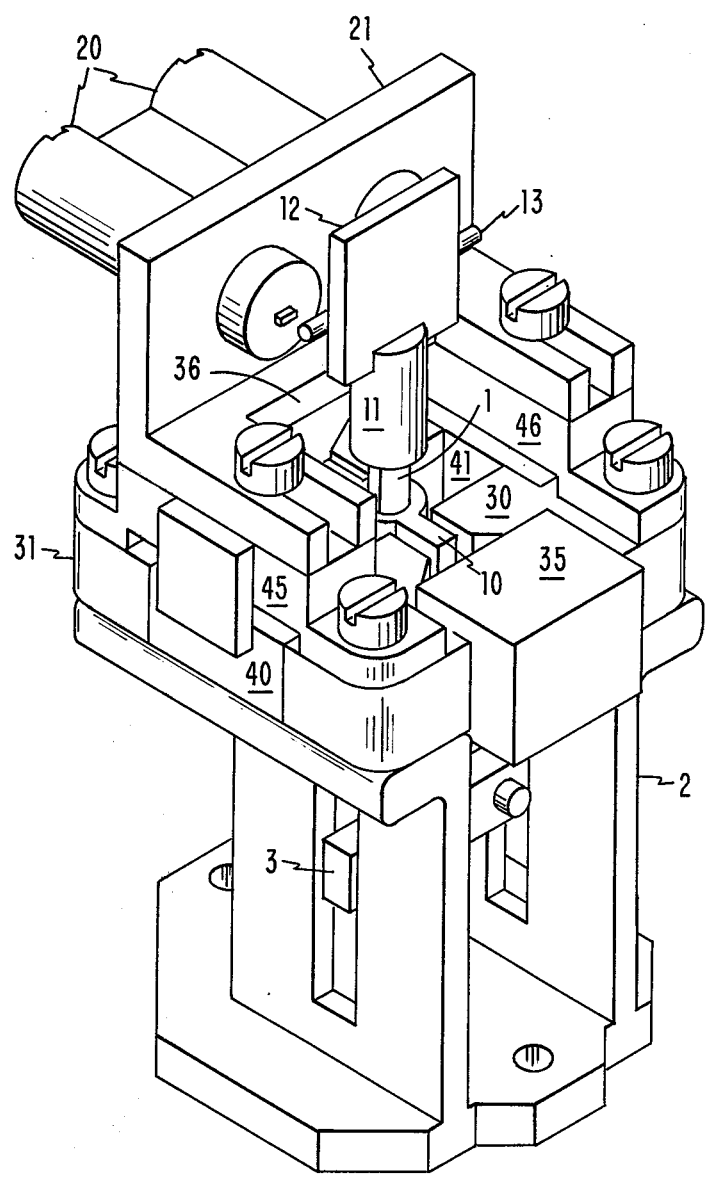
FIG. 1 is an isometric view of an actuator embodying the invention.

With reference to FIG. 1, which shows an electromagnetic actuator embodying the invention, a torsion bar 1 is affixed to a base member 2 by means of a torsion bar clamp 3. Also fixed at the base of 2 positioned on the torsion bar at the opposite end from clamp 3 is a drive armature 10. A mirror support element 11 is affixed to the torsion bar 1 at a point close to drive armature 10. A deflection mirror 12 is fastened to the mirror support 11 by means of any suitable adhesive such as an epoxy. A sense armature 13 is fastened to the back of the mirror in close proximity to sense windings 20 which are positioned on the assembly by means of the sense winding support 21. Each end of armature 10 is positioned in the air gap formed by the C-shaped core members 30 and 31 affixed to the base 2. Core members 30 and 31 have windings 35 and 36. The magnetic circuit between the core members is completed by a pair of permanent magnets 40 and 41 held in position by means of magnetic retainers 45 and 46 made of a non-magnetic, preferably plastic, material.

Figure 2:
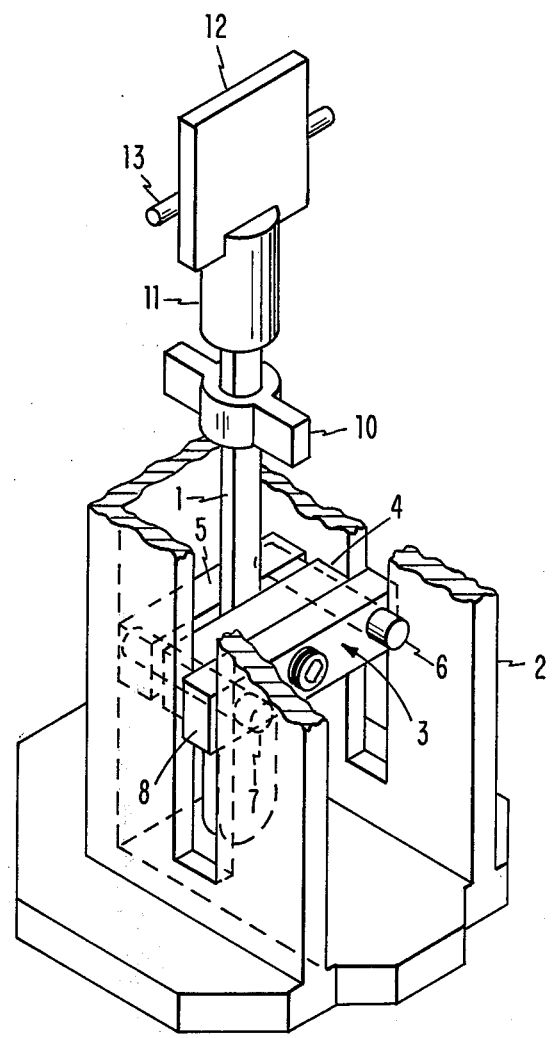
FIG. 2 is an isometric view of the armature portion of the actuator.

With reference to FIG. 2, the details of the torsion bar clamp 3 are shown. The torsion bar 1 is positioned between second clamp bar 4 and third clamp bar 5 which are held in alignment by means of alignment pins 6 and 7. A first clamp bar 8 is positioned to pass between clamp slots in the base member 2. A clamp screw 9 is then advanced to exert pressure on clamp bar 4 and retain the torsion bar between the clamp bars 4 and 5 as these elements are brought to bear against the rear of the base member 2. The slots in the base member permit adjustment of the torsion bar clamp upwards and downwards to vary the effective length of the torsion bar and thereby provide an adjustment of the resonant frequency of the assembly.

With specific reference to FIG. 3, the operation of the device will now be explained. FIG. 3 is representative of the magnetic circuits associated with the device. The C-shaped core members 30 and 31 each have a drive winding 35 and 36 associated therewith. The C-shaped core members 30 and 31 are connected by a pair of permanent magnets 40 and 41 to provide an alternative magnetic circuit to that which includes the air gap across the ends of core members 30 and 31. The flux generated by the permanent magnet 40 passes from a pole 45 of the permanent magnet through a portion of the C-shaped core member 30, across an air gap 47 to the armature 10, through the armature 10 and across the other gap 48 to the C-shaped core member 31 and back to the pole 49 of permanent magnet 40 in a fashion indicated by the arrows. The other permanent magnet 41 provides a magnetic flux which passes from pole 55 through a portion of C-shaped core member 30 across an air gap 57 to armature 10, through armature 10 and across air gap 58 to the C-shaped core member 31 and back to the pole face 59 of permanent magnet 55 as indicated by the arrows. When the drive windings are de-energized the position of the armature is shown in FIG. 3a with essentially identical air gaps between each face of the armature and its adjacent C-shaped core member pole piece. The slight differences in flux density in the air gaps between the armature 10 and core members 30 and 31 are not sufficient to move the armature because of the rigidity i.e., bending stiffness of the torsion bar 1.

Assuming now that the drive windings are energized with the polarity as shown in FIG. 3b, a magnetic flux is induced into the circuit in accordance with the arrows associated with the drive windings 35 and 36. It can be seen that the flux induced by drive windings 35 and 36 is additive across the air gap identified as 57 and the opposite air gap 47 associated with that same end of the armature 10 has a reduced flux due to the cancelling effect of the permanent magnet flux and the electromagnetic flux induced by drive winding 35. The result is that the armature tends to move in the direction of the pole face associated with the higher flux density. A similar action occurs on the other end of the armature 10 where the magnetic flux is additive in air gap 48 and tends to be reduced due to the cancellation effects in the air gap 58. The net result of this flux is to cause the armature 10 to swing in the direction as shown in FIG. 3b.

Since the drive windings 35 and 36 are intended to be energized with an alternating current signal or at least a reversible polarity signal, the effect of a reverse plurality drive current is shown in FIG. 3c. In this case the induced flux from the drive winding 35 is reversed in direction causing the flux density in the air gaps 47 and 58 to be increased causing rotation of the armature 10 in the opposite direction. If the drive signal applied to the drive windings 35 and 36 is set to a frequency approximately equal to the mechanical resonance of the device, the armature 10 and mirror 12 will experience large oscillations in a rotary fashion at the drive frequency. Since the mechanical structure provides a relatively high Q device, the response of the device to an off-resonance signal will be sharply attenuated and the device is incapable of operation over a fairly broad range of operating frequencies. However, the situation often demands a response curve which is broader than the mechanical characteristics alone provide.

Figure 6:
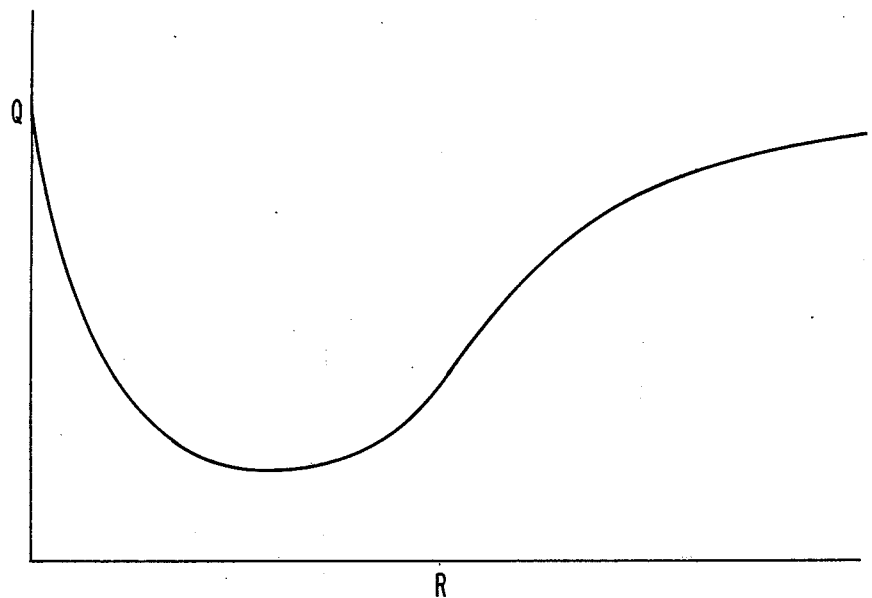
FIG. 6 is a graphical representation of the variation in Q as a function of the variable resistance.

FIG. 4 illustrates the means by which Q can be controlled to provide a Q tailorable to match the response desired in the electronic system. It will be appreciated that material differences and assembly differences from structure to structure will cause Q to vary even though an attempt is made to control this variable to very rigid specifications. It is therefore desirable to be able to assemble the device with somewhat relaxed tolerances and make an easily adjustable electrical compensation for these tolerances to bring the actual characteristic of the device into a fairly tightly controlled range. In the embodiment shown in FIG. 4 the drive winding associated with the C-shaped core member 30 is terminated with a variable resistance 70. The adjustment of this resistance permits a variation in the Q of the device. The device operates in essentially the same fashion as FIG. 3 except that the magnetic flux for drive responses is associated with the air gaps 48 and 58 at one end of the armature only. The other end of armature 10 operates in air gaps 47 and 57 effected by winding 35. The impedance seen by drive winding 35 operates to effectively control the Q in the fashion shown in FIG. 6. For a very low value of the resistance 70 the Q remains essentially the same. As the resistance is increased, a point is reached at which the minimum Q is developed. As the resistance is further increased, Q rises to approximately the original value. It will be appreciated that the resistance can therefore be varied to provide a desired value of Q without any mechanical adjustment.

FIG. 5 is illustrative of an alternative preferred arrangement for controlling Q. In this case, the drive windings 35 and 36 are connected in series as the arrangement in FIG. 3. However, included within the drive circuit is a variable resistance 80. This has essentially the same effect as the resistor of FIG. 4 except that it permits a symmetrical drive arrangement which may be desirable in certain situations. In this arrangement the magnetic flux for drive purposes is associated with both ends of armature 10 in much the same fashion as shown in FIG. 3. It will be appreciated of course that the source impedance for the drive signal is in effect part of resistance 80. However, the addition of a discrete resistor in series with the two windings makes it possible to vary the Q without necessity for alteration of the source impedance and its attendent problems.

Even with the ability to vary Q to achieve a desired nominal value, there are occasions where the frequency of the device is mechanically constructed may be outside a desirable limit. In this case, it would be advantageous to provide a simple adjustment for the alternation of the resonant frequency. One that does not require exacting testing techniques or the precise adjustment of minute elements.

Figure 7:
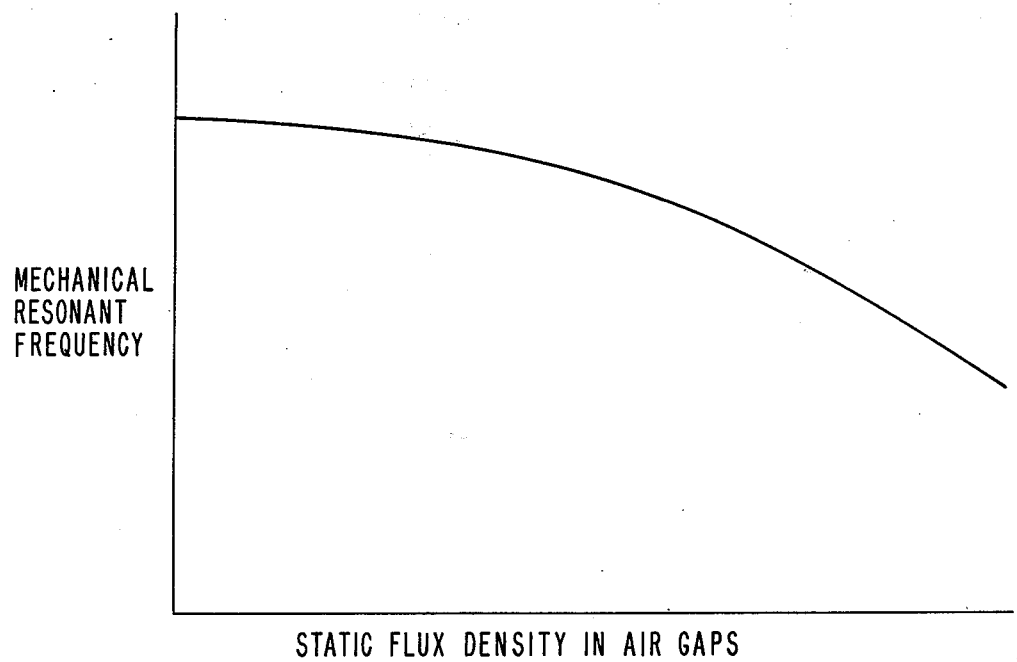
FIG. 7 is a graphical representation of the variation in resonant frequency as a function of the flux density in the air gaps of the device.

With reference to FIG. 3, adjustable magnetic elements 90 and 91 are associated with each of the permanent magnets. This piece of magnetic material constitutes an alternative path for the magnetic flux generated by the permanent magnets 45 and 55. The further the magnetic piece 90 is moved into alignment with the permanent magnet 55, the greater the flux which flows through the magnetic piece 90. The more flux flowing through this magnetic piece, the less flux available to flow across the air gaps. Consequently, the flux density in the air gap will be reduced as the permanent magnet piece is arranged into a more overlapping relationship with the permanent magnet and thereby shunts the magnet flux. The effect of reduced flux in the air gap is shown in FIG. 7. As the flux in the air gaps 47, 48, 57 and 58 is increased the resonant frequency is decreased. This allows a device which has been constructed according to relatively loose mechanical tolerances to be brought into precise frequency adjustment without the need for a mechanical adjustment of the resonant elements.

If the armature 10 is centrally positioned between the pole faces, the flux flow of $\phi_s$ due to the permanent magnets 40 and 41 is confined to the two loops indicated in FIGS. 3, 4 and 5. As discussed below, the path of the permanent magnet flux is altered if the armature is displaced from its neutral position.

When the coils 35 and 36 are energized, a dynamic flux $\phi_d$ is produced. Since the permanent magnets 40 and 41 represent a high reluctance, each coil flux $\phi_d$ remains in either the lower or upper path independent of armature position.

As readily seen from FIGS. 3, 4 and 5, the dynamic flux $\phi_d$ adds to the static flux $\phi_s$ through the air gap on one side of the armature and subtracts through the other. The result is a force imbalance at each end of armature 10. For the polarity of the coils shown in FIG. 1, a torque is produced about the center of the armature. By driving the coils (and thus creating an alternating torque) near the resonant frequency of the mechanical oscillator, large amplitudes of motion can be obtained for a minimal power input.

As armature motion results from the torque created by the dynamic drive, an important effect occurs. With the armature displaced from its central position, the permanent magnet flux $\phi_s$ is no longer contained in the two loops of FIG. 3a. Instead, a portion of this flux $\phi_s'$ is diverted through a path containing the coil as shown in FIG. 3b. Since armature position varies as a function of time, $\phi_s'$ is time dependent. A back voltage or induced emf results. The resulting induced current dissipates energy as it flows through electrical resistance in the drive circuit.

Thus a mechanism is created by which energy is dissipated as a result of mechanical motion. Furthermore, the amount of energy dissipated is proportional to the amplitude of mechanical motion. Thus, the mechanical "Q" or sharpness of the resonance becomes a function of the electromagnetic parameters affecting the level of induced current and energy dissipation. In particular, the value of the resistance in the drive circuit and the strength of the permanent magnets affect the amount of energy dissipation for a given motion and hence affect the mechanical "Q". This ability to affect mechanical response near resonance through the adjustment of electromagnetic parameters becomes very attractive.

Another feature of the system is that the resonant frequency is also a function of electromagnetic parameters. This is in addition to the usual inertia and stiffness influence on the natural frequency.

The physical reasoning behind this result is that the diversion of the permanent magnet flux $\phi_s$ from its two equilibrium paths of FIG. 3a creates a situation similar to that of a "negative spring rate". That is, a small rotation of the armature from its neutral position creates a flux flow pattern (FIG. 3b) and resulting torque which tends to cause even larger rotations. Without the restoring torque of the torsional rod, the neutral position for the armature would be unstable and the armature would seal against the pole faces.

Dynamically, the amount of flux diverted through the coil cores depends upon the electrical resistance, number of coil turns, strength of the magnets, and the air gap reluctances. The effect or level of this negative spring rate depends upon these electromagnetic parameters. This negative spring rate effect when superimposed with the torsional rod stiffness reduces the equivalent mechanical stiffness and hence the device resonant frequency.

Two key factors in the application of a resonant device are an ability to reliably control system "Q" and to devise an economical procedure for "tuning" the resonant frequency. Since both "Q" and resonance are dependent upon electromagnetic parameters, it is feasible to adjust their values to meet application specifications. In particular, the resistance $R_s$ and the level of effective magnet flux $\phi_s$ are quite easy to adjust.

The resistance can be varied by a potentiometer setting as discussed. The effective strength of the permanent magnets can be controlled by providing an adjustable leakage path in parallel with the primary flux path as shown.

A theoretical analysis of the system is helpful in understanding the key parameters.

In deriving the magnetic loop equations it is assumed that the permanent magnets are pure flux sources. The dynamic flux $\phi_d$ then remains in either the lefthand or righthand loop of FIG. 3b. The equation for either loop is:

$$F = (R_o - r)(\phi_d + \phi_s) + (R_o + r)(\phi_d - \phi_s) \quad (1)$$
$$F = 2R_o\phi_d - 2r\phi_s$$

where:

$$R_o = \frac{f_f g_o}{\mu_o A_p} \; ; \; r = \frac{f_f l_f \theta}{\mu_o A_p}$$

and

F—magnetomotive force of drive coils
$f_f$—gap fringing factor
$A_p$—pole face area
$g_o$—nominal gap setting
$l_f$—distance from center of rotation to center of pole face
$\theta$—angular motion of armature
$\mu$—permeability of air.

These expressions for the lumped reluctances are, of course, only approximate since the flux flow pattern is much more complex than that indicated by this model. In particular, when the armature is in a rotated position, the flux density across the pole faces becomes very non-uniform. Saturation probably occurs at the tips of the armature since these points come closest to the pole face. A more accurate model of this situation would become quite complex. In addition, any hysteresis losses in the conducting core elements have been neglected.

The effects of eddy currents can be introduced into this model by introducing an eddy current term into the expression for the magnetomotive force term F $$F = (Ni/2) - N_e i_e \quad (2)$$

where N is the number of turns for the drive coil, i/2 is the current to the drive coil, $N_e$ is the number of turns for the "eddy current coil", and $i_e$ is the eddy current in the "eddy current coil".

Electrical equations for the drive system and the eddy current coils are $$V = \left(R_s + \frac{R_c}{2}\right)i + N\frac{d\phi_d}{dt} \quad (3)$$

-continued $$i_e R_e = N_e \frac{d\phi_d}{dt}$$

where $R_s$ is the in series resistance, $R_c$ the coil resistance, and N the number of turns.

Finally, the equation of motion for the mechanical oscillator is $$J\ddot{\theta} + K_t^*\theta = T = \frac{l f_f}{2\mu_o A_p}[(\phi_s + \phi_d)^2 - (\phi_s - \phi_d)^2] \cdot 2 \quad (4)$$

$$= 4\frac{l f_f}{\mu_o A_p}[\phi_s \phi_d]$$

A steady-state solution of the following form is assumed for equations (1) through (4).

$$V = V_o e^{j\omega t}; \phi_d = \phi_{do} e^{j\omega t}; i_e = i_{eo} e^{j\omega t} \quad (5)$$
$$\theta = \theta_o e^{j\omega t}; i = i_o e^{j\omega t}$$

The solution can be written in the following form:

$$\frac{K_t \theta_o}{2b_1 V_o/\omega n} = \frac{a_1 - j(1 + ea_1)}{[a_1^2 + (1 + ea_1)^2][(1 - \frac{\omega^2}{\omega_n^2} - \frac{2a_1^2 d_1}{a_1^2 + (1 + ea_1)^2}) + j(\eta_s + \frac{2a_1 d_1(1 + ea_1)}{a_1^2 + (1 + ea_1)^2})]}$$

$$\frac{\phi_{do}}{V_o/con} = \frac{1}{[(a_1 - \frac{2a_1 d_1(1 - \omega^2/\omega^2)}{(1 - \omega^2/\omega_n^2)^2 + \eta_s^2}) + j((1 + ea_1) + \frac{2a_1 d_1 \eta_s}{(1 - \omega^2/\omega_n^2)^2 + \eta_s^2})]}$$

$$\frac{i_o}{V_o/R_t} = [1 - j\frac{\phi_{do}}{V_o/\omega_n}]$$

where
$R_T = R_s + R_c/2$
$a_l = R_o R_T/\omega N^2$
$b_l = 2l f_f \phi_s/\mu_o A_p$
$d_l = b_l l \phi_s / K_t g_o$
$K_t^* = K_t(1 + j\eta_s)$
$e = \omega N_e^2 / 2 R_o R_e$
$\omega_n^2 = K_t/J$ Several items of interest pertaining to the model derivation and solution forms are worthy of note here. The first is that a term contributing to mechanical damping arises solely through the electromagnetic drive system. This electromagnetic loss factor $\eta_e$ given by $$\eta_e = \frac{2a_1 d_1(1 + ea_1)}{a_1^2 + (1 + ea_1)^2}$$

occurs as a result of a component of the changing flux flow through the drive coils induced by armature motion. This flux flow, in turn, induces a current and energy is dissipated through electrical resistance. As discussed previously, this mechanism is attractive as a means for controlling system "Q".

The second item of interest is that the forcing frequency at which maximum mechanical motion occurs is also affected by electromagnetic parameters. In particular, maximum amplitude occurs when $$1 - \frac{\omega^2}{\omega_n^2} - \frac{2a_1^2 d_1}{a_1^2 + (1 + ea_1)^2} = 0$$

This indicates that maximum motion occurs at a frequency less than $\omega_n$. As mentioned previously this effect may have significance in tuning these resonant devices.

The maximum electromagnetic loss factor $\eta_e$ as a function of $a_l$ occurs when $$a_l = 1/(1 - e)$$

and yields $\eta_e = d_l$. The amplitude of the motion $|\theta_o|$ at resonance becomes $$|\theta_o| = \frac{2b_1 V_o}{\omega N K_t} \frac{1}{a_1^2 + (1 + ea_1)^2} \frac{1}{(\eta_s + \eta_e)}$$

Thus the larger the value for $a_l$, the more voltage $V_o$ is required to achieve a given amplitude of motion. This becomes the effects or influence of eddy currents. That is, to achieve a certain amount of damping $\eta_e$, larger values of $a_l$ are required as the eddy current factor $e$ increases. This implies larger voltages and more power to achieve that motion. For high frequency application it may become necessary to laminate the core structure.

It is emphasized that this model and its solution are only approximate. Many assumptions are required so that closed form solutions could be obtained. In addition, some "fudge factors" (e, $\eta_s$, $f_f$) have been introduced which will be determined experimentally. In spite of these simplifications some of the key parameters have been identified and their effect on system response determined. Most importantly, the dependence of system "Q" and resonant frequency on the control resistance $R_s$ and strength of the magnets $\phi_s$ has been shown explicitly. Finally, these model equations are sufficiently accurate to be used as a basis for developing initial hardware and making design changes.

A preferred embodiment utilized a mirror approximately 1 mm thick and 1 cm² and provided a deflection angle of 2.5° peak to peak at a resonant frequency of 2500 Hz.

The armature size was taken as 0.5 inch long with a 0.125 by 0.0625 inch cross-section. Armature material has silicon iron. The brass torsional rod had a rectangular cross-section 0.125 by 0.045 inch. The length is adjustable as shown but for resonance to occur at 2500 Hz, the length of the rod was around 0.67 inch.

Pole face areas were 0.125 by 0.125 inch and the nominal gaps set at 0.010 inch. Saturation density for the armature was taken as 16,500 gauss. Thus for saturation the permanent magnet flux $\phi_s$ becomes $4.16 \times 10^{-6}$ webers.

For the fringing factor $f_f$, an empirical handbook value for this geometry of 0.54 was used. With a torsional rod stiffness $K_t = 23$ in−lb/rod the parameter $d_l$ becomes equal to 0.05. This, recall, is the maximum value for the loss factor $\eta_e$. This implies a minimum Q of 20 and corresponding bandwidth of 125 Hz.

The number of coil turns was 400. The resistance 70 was adjustable. The permanent magnets were ALNICO V, 0.5 inch long and 0.125 by 0.25 inch in cross-section. These magnets proved to be sufficient for saturating the armature.

For optimum performance the core should be laminated since eddy current effects are significant.

Q can be expressed as: (assuming eddy current effects are negligible) Typically R is 20–100

$$Q = \frac{1}{\eta_s + \frac{aR}{bR^2 + 1}}$$

Where a and b are constants dependent upon various magnetic and mechanical parameters, $\eta_s$ is the structural loss factor, and R is the circuit resistance.

Resonant frequency can be expressed as:

$$f_r = f_n \sqrt{1 - \frac{CR^2}{bR^2 + 1}}$$

as a function of electrical resistance, and:

$$f_r = f_n \sqrt{1 - d B_s^2}$$

as a function of permanent magnet flux.

Where c and d are constants dependent upon various system parameters, $f_n$ is the undamped mechanical natural frequency, and $B_s$ is the static flux density through the gap.

What is claimed is:

1. An electromagnetic actuator comprising:
   first and second "C" shaped core members of soft magnetic material each having a pair of opposing pole faces defining an air gap,
   first and second permanent magnet means connecting said "C" shaped core members to create similar magnetic poles at the opposing pole faces of said "C" shaped core members,
   an armature of soft magnetic material,
   torsion bar means for supporting said armature for movement about the center of mass of said armature with the ends of said armature positioned largely within the air gaps of said "C" shaped core members,
   a drive winding on said first "C" shaped core member, adapted to be energized with an alternating current drive signal to create a differential flux density between said armature and opposing pole faces of said first "C" shaped core member causing said armature to move initially in the direction of the pole face having the air gap with the higher flux density and thereafter, to oscillate at the frequency of said alternating current drive signal, and
   variable impedance means connected in series with said drive winding for selectively adjusting the Q of said actuator.

2. A device according to claim 1 wherein said torsion bar is rectangular in cross-section.

3. A device according to claim 1, having:
   a second winding on said second "C" shaped core member, and wherein
   said impedance means is in series circuit with each of said first and second windings for controlling the Q of said actuator.

4. A device according to claim 3 wherein said torsion bar is rectangular in cross-section.

5. A device according to claim 1 having:
   a magnetic shunt in parallel with one of said permanent magnets to alter the resonant frequency of said actuator.

6. A device according to claim 5 wherein said torsion bar is rectangular in cross-section.

7. A device according to claim 1 wherein:
   the length of said torsion bar means is easily alterable to adjust the resonant frequency of said device.

8. A device according to claim 1 further including:
   a base member,
   means affixing said permanent magnet means and said core members to said base member,
   adjustable clamp means holding said torsion bar means in a predetermined relationship to said base member and said core members.

* * * * *